Sept. 2, 1969  R. JURENZ  3,464,338

REFLEX VIEWFINDER

Filed Dec. 27, 1966  2 Sheets-Sheet 1

INVENTOR
ROLF JURENZ
By Young + Thompson
ATTYS.

Sept. 2, 1969  R. JURENZ  3,464,338
REFLEX VIEWFINDER
Filed Dec. 27, 1966  2 Sheets-Sheet 2
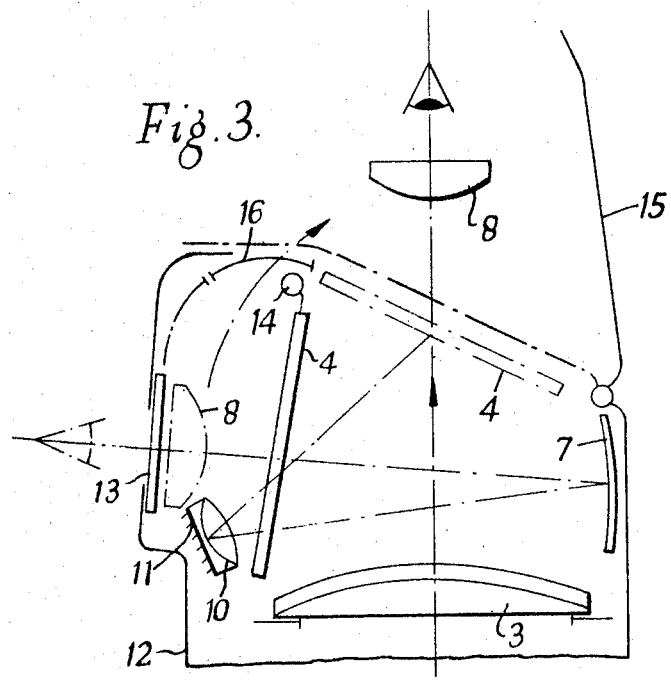
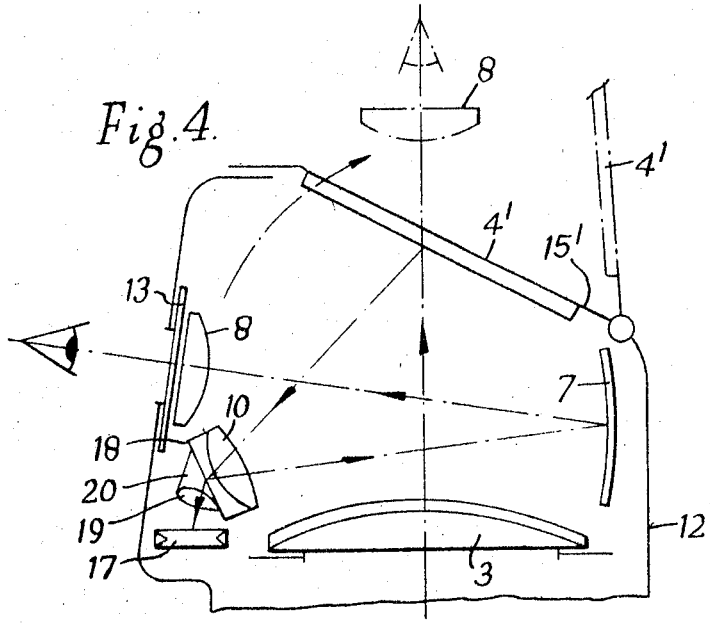
INVENTOR
ROLF JURENZ
By Young + Thompson
ATTYS.

3,464,338
REFLEX VIEWFINDER
Rolf Jurenz, Dresden, Germany, assignor to VEB Pentacon Dresden Kamera- und Kinowerke, Dresden, Germany
Filed Dec. 27, 1966, Ser. No. 605,065
Int. Cl. G03b 19/12
U.S. Cl. 95—42                                                                7 Claims

ABSTRACT OF THE DISCLOSURE

The photographic reflex camera is provided with a viewfinder system which has a first convergent lens receiving light from the reflex mirror for producing a first real image, on a second convergent lens via a pivotable mirror. The second convergent lens has a mirrored surface which reflects the image to a concave mirror from which the image is viewed through an eyepiece. The eyepiece can be pivoted to the optical axis of the second convergent lens by means of a pivotable cover formed as part of the viewfinder housing in which case the pivotable mirror is pivoted out of said optical axis.

Background to the invention

The invention relates to a reflex viewfinder arrangement with two real intermediate image planes, in which the exposure objective and an intermediate image-forming objective are provided for the formation of the real intermediate images, a concave mirror being arranged in the path of viewfinder rays, which mirror forms an image of the exit pupil of the viewfinder in combination with the viewfinder eyepiece in the vicinity of the eye, which arrangement can be used for photographic mirror reflex cameras—advantageously with a viewfinder light hood—with which it is possible to view the ground glass image either from above perpendicularly of the exposure direction or in the exposure direction and optionally with exposure measurement in the path of viewfinder rays.

It is usual with mirror reflex cameras to view the ground glass image by means of an eyepiece, both perpendicularly of the exposure direction and also by means of mirrors and prisms in the viewing direction. It is known to use for this purpose viewfinder arrangements with a light hood and only one intermediate image plane, which is at the same time the focussing plane. Reflex cameras are also known in which also lens systems in conjunction with mirrors can be used instead of flat mirrors and/or prisms for the purpose of an upright and non-laterally inverted observation of the image. It is also possible to consider reflex viewfinder arrangements with several intermediate image planes, as is the case for example with mirror reflex cinematographic cameras.

The known viewfinder arrangements are used more especially for miniature mirror reflex cameras. If it should be desired to use these viewfinder arrangements for cameras of medium or large size, dimensions would result which would make the camera clumsy and inconvenient.

Measuring viewfinders operating on the coincidence principle with a real intermediate image plane are also known for photographic cameras, these being used more especially as direct vision viewfinders. As regards optical means, both collecting and also deflecting structural elements in the form of lenses, mirrors and prisms are used for the non-laterally inverted and upright image viewing. These viewfinder arrangements are unsuitable for mirror reflex cameras.

The object of the invention is to provide a reflex viewfinder arrangement with two real intermediate image planes, more especially for cameras of medium size or large size and at the same time to incorporate the known advantages of a viewing of the ground glass image from above, perpendicularly of the direction of exposure, and also in the exposure direction. It is an object of the invention to bring the space required for the viewfinder to a minimum by suitable optical means and giving an extremely small construction.

Summary of the invention

According to the invention we provide a photographic reflex camera having a housing, an objective mounted on said housing, a reflex mirror in the housing, and a first convergent lens situated in said housing at the real image plane of the objective when the image light rays are reflected by said reflex mirror, in which there is provided a pivotable mirror arranged to receive the image light rays from said first convergent lens, a second convergent lens arranged to receive the light rays reflected from the said pivotable mirror, said second convergent lens having a mirrored surface situated at the plane of the second real image formed by said first convergent lens, a concave mirror for receiving the image from said mirrored surface, and an eyepiece pivoted within the housing receiving the reflected image from the concave mirror, said eyepiece being pivotable between a first position where it is in close physical proximity with the second convergent lens and its optical axis forms an angle of less than 60° with the optical axis of the second convergent lens subtended by the concave mirror, and a second position on the optical axis of the first convergent lens, in which second position said pivotable mirror is pivoted out of the optical axis of the first convergent lens.

In accordance with another feature, the intermediate image-forming optical system for the second real intermediate image formation is so designed that it consists either of a single-member or of a multiple member system of positive refractive power, of which the light exit surface is mirrored or partially mirrored in known manner, the path of rays being reflected back at an acute angle in the system. The viewfinder light rays reflected back by the mirror surface through the same optical system pass to the concave mirror arranged in the second real intermediate image-forming plane.

The advantages resulting from this arrangement of an intermediate image-forming objective provided with a mirror surface are characterised by a simple, space-saving construction. In addition, a considerable increase in the magnification is possible. Finally, the eyepiece focal length is the same for both viewing directions.

According to another feature of the invention, the viewfinder arrangement, which is provided with an exposure measuring device in the path of viewfinder rays, is so constructed that a photo-electric converter (photo resistance) is arranged behind the partially mirrored surface of the intermediate image-forming objective. In order to guarantee a best possible image formation of a fixed viewfinder image section on the photoresistance, an optical collective system is arranged between the image-forming objective and photoresistance. The collecting system can in advantageous manner be cemented on the partially mirrored surface of the intermediate image-forming optical system. It is thus possible to measure a section of the image or a complete image.

Instead of an optical collective system, it is also possible according to the invention to arrange a light conductor which concentrates the light between the partially reflecting surface of the intermediate image-forming objective and the photo-electric converter, the light entry surface of said conductor corresponding approximately to the size of the partially mirrored surface of the intermediate image-forming optical system whereas the light exit surface of said conductor, which is arranged opposite the photo-electric converter (photoresistance), with or without air gap, is several times smaller than the light entry surface. A best possible measurement result is likewise guaranteed by this arrangement, in that the illumination strength in the measuring plane and the illumination strength in the film plane is in a constant ratio. The exposure measuring arrangement with light conductor permits an integral measurement.

Brief description of the drawings

The invention is explained by reference to a number of constructional examples which are shown diagrammatically and in side elevation in the drawings, wherein:

FIGURE 3 shows a part of the camera housing with viewfinder light hood.

FIGURE 4 shows a viewfinder light hood with part of the exposure measuring arrangement.

Description of preferred embodiments

Figure 1:
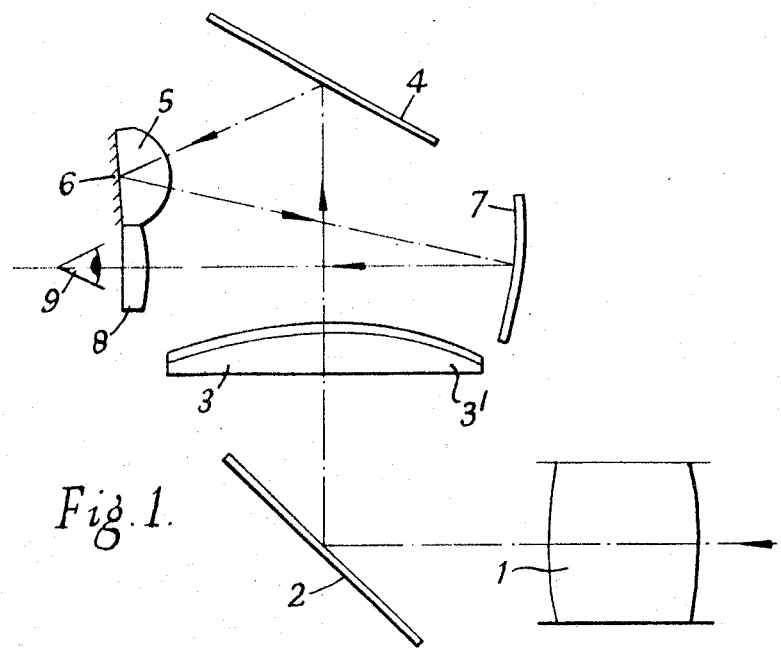
FIGURES 1 and 2 show the reflex viewfinder arrangement with different positions of the intermediate image-forming optical system provided with a reflecting surface.

According to FIGURE 1, the light coming from the exposure objective 1 is conveyed by way of a reflex mirror 2 to the image field lens 3, which here acts as a first intermediate image-forming plane, by way of the mirror 4 and the intermediate image-forming lens 5 and via the reflecting suface 6 to the concave mirror 7, which acts as a second intermediate image-forming plane, and thence via the eyepiece 8 to the eye 9. The image of the subject of the exposure being formed in the image plane 3' is formed in an upright position and without lateral inversion on the concave mirror 7 by means of a simple intermediate image-forming lens 5 with a mirror surface 6. The concave mirror image can be viewed by means of the eyepiece 8.

Figure 2:
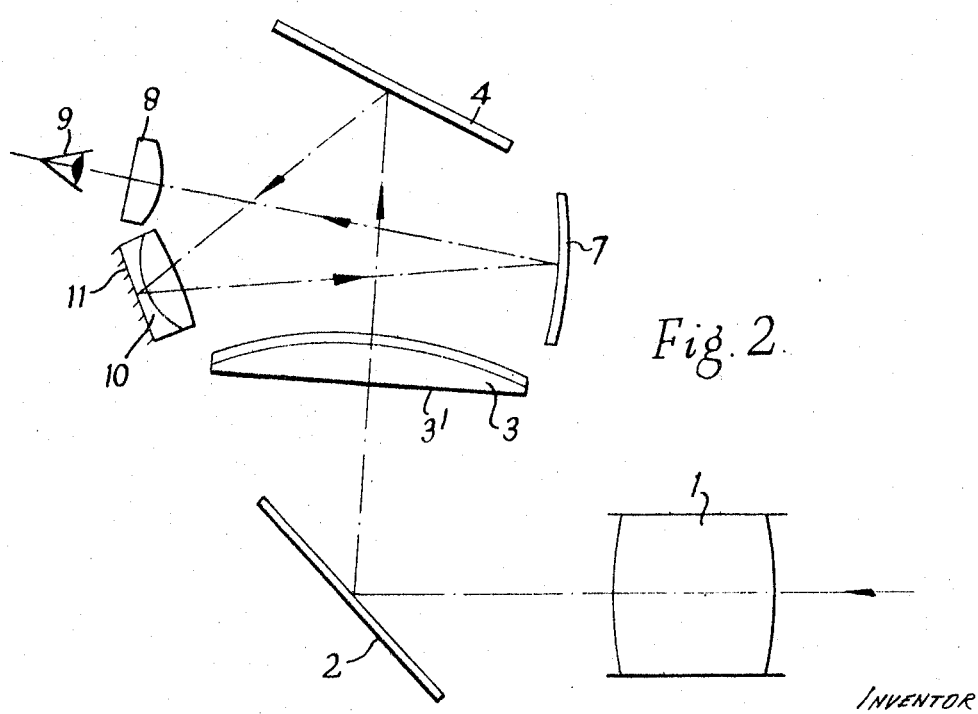

As can be seen from FIGURE 2, instead of the intermediate image-forming objective 5 consisting of an optical component, there is provided a multi-part intermediate image-forming objective 10 which improves the quality of the image, the light exit surface of said objective 10 being provided with a mirrored surface 11.

FIGURE 3 shows part of a camera housing with a viewfinder light hood arrangement, with which it is possible for the ground glass image to be viewed both in the exposure direction and also from above. The optical components described in connection with FIGURE 2 are situated in the upper part of the camera housing 12; the image field lens 3, the inclined mirror 4 disposed above the lens 3 and shown in chain-dotted lines, the intermediate image-forming objective 10 provided with the mirrored surface 11, the concave mirror 7, the eyepiece lens 8 which is shown in chain-dotted lines and a transparent cover disc 13.

The upper part of the camera housing 12 is so constructed in a manner known per se by automatically acting control means that the mirror 4 is pivotally mounted by means of a hinge 14. As soon as a cover 15 closing the camera housing 12 is opened, the eyepiece lens 8, after inward swinging of the mirror 4, is simultaneously swung out of the camera housing into the position shown in full lines according to FIGURE 3. After the eyepiece lens 8 has swung out of the camera housing 12, a cover flap 16 actuated by the said control means is displaced partly in front of the camera opening made free by the cover 15, in order thus to shield against light incident from above.

FIGURE 4 shows a reflex viewfinder arrangement with exposure measurement in the path of viewfinder rays. Disposed behind the light exit surface 18 of the intermediate image-forming objective 10, which is partially mirrored, is a photo-electric converter, advantageously a photo-resistance 17, which receives a part of the viewfinder light beam. Provided between the objective 10 and photo-resistance 17 is an optical collecting system 19, which projects the viewfinder image or a section of said image onto the photo-resistance 17. The optical collecting system 17 is arranged on the partially mirrored light exit surface 18 of the intermediate image-forming objective 10. The mirror 4' disposed above the image field lens 3 is connected to the cover 15' which closes the camera housing 12. As the cover 15' is opened or closed, the eyepiece lens 8 is swung simultaneously with the cover by a control mechanism which is not shown.

In conjunction with the optical collecting system 19, it is also possible to provide in a manner known per se a light conductor 20 which concentrates the light, said conductor being so arranged that the light entry surface corresponds approximately to the size of the partially mirrored surface 18. On the contrary, the light exit surface is several times smaller than the light entry surface.

It is within the scope of the invention that the entire viewfinder unit which in fact contains the image-forming objective 10 with the photo-electric converter 17, the optical collecting system 19 or the light conductor 20, the concave mirror 7, the eyepiece lens 8 and the mirror 4 or 4', is also adapted to be interchangeable.

I claim:

1. In a photographic reflex camera having a housing, an objective mounted on said housing, a reflex mirror in the housing, and a first convergent lens situated in said housing at the real image plane of the objective when the image light rays are reflected by said reflex mirror, the provision of a pivotable mirror arranged to receive the image light rays from said first convergent lens, a second convergent lens arranged to receive the light rays reflected from the said pivotable mirror, said second convergent lens having a mirrored surface situated at the plane of the second real image formed by said first convergent lens, a concave mirror for receiving the image from said mirrored surface, and a eyepiece pivoted within the housing receiving the reflected image from the concave mirror, said eyepiece being pivotable between a first position where it is in close physical proximity with the second convergent lens and its optical axis forms an angle of less than 60° with the optical axis of the second convergent lens subtended by the concave mirror, and a second position on the optical axis of the first convergent lens, in which second position said pivotable mirror is pivoted out of the optical axis of the first convergent lens.

2. A photographic reflex camera according to claim 1, wherein the second convergent lens has positive refractive power.

3. A photographic reflex camera according to claim 2, including a light measuring circuit, said second convergent lens being partly mirrored so as to be light permeable; a photo-cell in said light measuring circuit being located in close proximity to said partly mirrored surface to receive light passing therethrough.

4. A photographic reflex camera according to claim 3, wherein a light collecting system is arranged between said partly mirrored surface and said photo-cell.

5. A photographic reflex camera according to claim 4, wherein said light collecting system is cemented to the partly mirrored surface.

6. A photographic reflex camera according to claim 5, wherein the entry surface of the light collecting system corresponds approximate in size to the partly mirrored surface, the outlet surface of said collecting system by smaller than the light entry surface.

7. A photographic reflex camera according to claim 1, having a pivotable cover forming part of the housing, means connecting said pivotable mirror and said eyepiece to said cover, wherein when the cover is opened the eyepiece moves into its second position and the mirror out of the optical axis of the first convergent lens.

References Cited
UNITED STATES PATENTS

| | | | |
|---|---|---|---|
| 3,327,600 | 6/1967 | Trankner | 95—42 |
| 3,332,330 | 7/1967 | Broschke et al. | 95—42 |

NORTON ANSHER, Primary Examiner

R. L. MOSES, Assistant Examiner